United States Patent [19]

Proctor

[11] Patent Number: 5,872,645
[45] Date of Patent: Feb. 16, 1999

[54] TELECOMMUNICATIONS NETWORK

[75] Inventor: Richard John Proctor, Dorset, United Kingdom

[73] Assignee: GPT Limited, Hortsville, N.Y.

[21] Appl. No.: 950,107

[22] Filed: Oct. 16, 1997

Related U.S. Application Data

[63] Continuation-in-part of Ser. No. 498,427, Jul. 5, 1995, abandoned.

[30] Foreign Application Priority Data

Jul. 7, 1994 [GB] United Kingdom ................... 9413716
Sep. 12, 1994 [GB] United Kingdom ................... 9418354

[51] Int. Cl.⁶ ....................................................... H04J 14/08
[52] U.S. Cl. ........................... 359/136; 359/123; 359/167
[58] Field of Search ..................................... 359/123, 125, 359/136–137, 157, 167–168; 370/539; 371/30, 77–7, 39–1

[56] References Cited

U.S. PATENT DOCUMENTS

| | | | |
|---|---|---|---|
| 4,719,624 | 1/1988 | Bellisio | 370/539 |
| 5,150,247 | 9/1992 | Sharpe et al. | 359/136 |
| 5,210,745 | 5/1993 | Guinand et al. | 370/539 |
| 5,398,129 | 3/1995 | Reimann | 359/137 |
| 5,541,931 | 7/1996 | Lee | 359/135 |

FOREIGN PATENT DOCUMENTS

| | | |
|---|---|---|
| 0 425 871 A2 | 5/1991 | European Pat. Off. . |
| 0 437 072 A1 | 7/1991 | European Pat. Off. . |
| WO 89/05070 | 6/1989 | WIPO . |

Primary Examiner—Kinfe-Michael Negash
Attorney, Agent, or Firm—Kirschstein, et al.

[57] ABSTRACT

An optical communications network having a Head End Unit connected to a plurality of groups of Network Termination Equipments (NTE) and/or Optical Network Units (ONU), the downstream communication being by Time Division Multiplex, has a group multiplexed onto a stream and a plurality of streams are combined into a higher speed multiplex and the upstream communication is by Time Division Multiplex Access.

9 Claims, 9 Drawing Sheets

Fig.3.
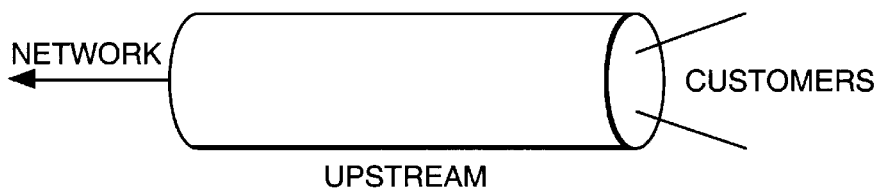
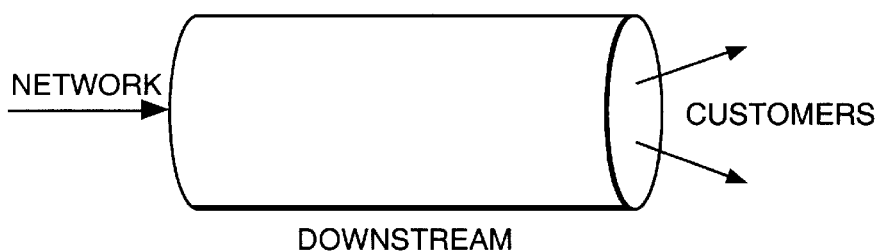
Fig.4.
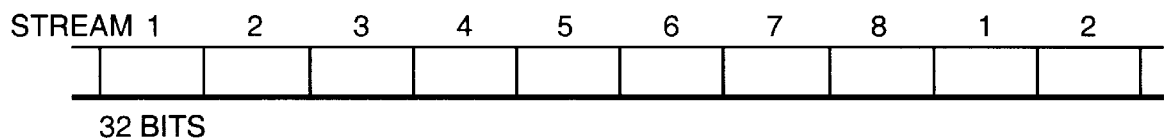
Fig.5.
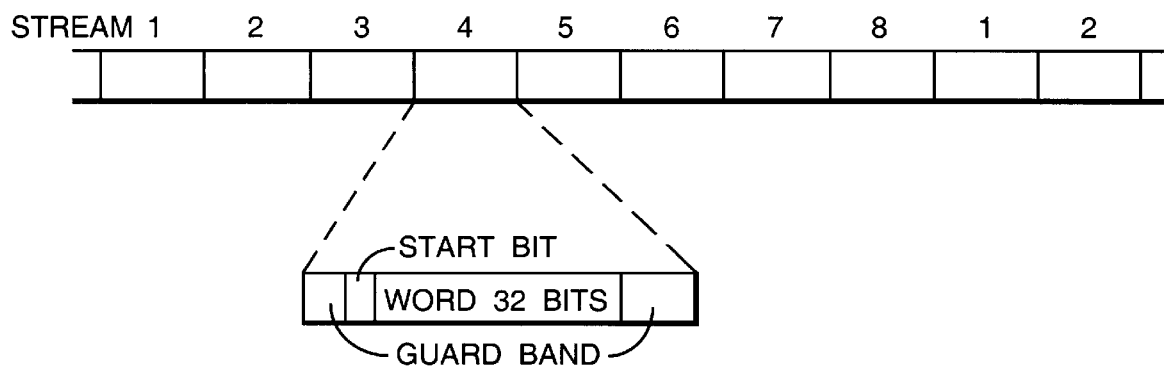

Fig.6.

DOWNSTREAM

| Ctrl+<br>FRAME | CELL | CHECK<br>CODE |
|---|---|---|
| 8 BITS | 53 OCTETS | 16 BITS ? |

NOTE THIS IS 2 TIMES FASTER THAN UPSTREAM

UPSTREAM

| Ctrl | 2B | SPARE | CHECK<br>CODE | CELL | SPARE | CHECK<br>CODE |
|---|---|---|---|---|---|---|
| 16 BITS | 32 BITS | 6 BITS | 10 BITS | 53 OCTETS | 8 BITS | 16 BITS ? |

SMALL CONTROL SLOT      LARGER CELL SLOT FROM ANOTHER NTE
FROM ONE NTE

Fig.7.

| NUMBER OF CELLS OF<br>HIGH PRIORITY WANTED<br>0-255 | NUMBER OF CELLS OF<br>LOW PRIORITY WANTED<br>0-255 |
|---|---|

Fig.8.

| PHASE | CODING | INTERPRETATION | NOTES |
|---|---|---|---|
| 1 | STREAM IDENTITY | IN THIS PHASE THE STREAM NUMBER IS GIVEN, THIS IS USED TO IDENTIFY AND DELINEATE THE STREAM. ONCE PER CYCLE IT IS USED TO IDENTIFY WAVELENGTH NUMBER. | |
| | 000SSSSS | SENT ON SLOTS 0-30 TO IDENTIFY STREAM SSSSS, USED FOR FRAMING. | A |
| | 001WWWWW | USED ON SLOT 31 TO IDENTIFY WAVELENGTH NUMBER WWWWW | B |
| 2 | SLOT IDENTIFICATION | THIS TELLS WHICH NTE TO SEND ITS CONTROL SLOT, AND DOES SMALL RANGE ADJUSTMENT | |
| | 100NTEID | USED TO IDENTIFY EACH FRAME, AND INFORM WHICH NTE TO SEND ITS CONTROL SLOT. THE NTE WHOSE IDENTITY IS NTEID SENDS THE CONTROL SLOT | C |
| | 101NTEID | USED TO IDENTIFY EACH FRAME. THE NTE WITH THE IDENTITY NTEID CAN REMAIN IN AN ASLEEP MODE,-SEE POWER DOWN OPERATIONS. | D |
| | 110NTEID | USED TO IDENTIFY EACH FRAME. THE NTE WHOSE IDENTITY IS NTEID SENDS THE CONTROL SLOT. THE NTE SHOULD ADVANCE ITS RANGE BY ONE BIT. | E |
| | 111NTEID | USED TO IDENTIFY EACH FRAME. THE NTE WHOSE IDENTITY IS NTEID SENDS THE CONTROL SLOT. THE NTE SHOULD RETARD ITS RANGE BY ONE BIT. | E |
| 3 | CONTROL UPSTREAM | | |
| | 010NTEID | THE IDENTIFIED NTE CAN SEND A CELL | F |
| | 01111111 | NO NTEs TO SEND A CELL | F |

NOTES

A THIS CONTROL CODE IS THE MAIN FRAMING TO IDENTIFY AND EXTRACT THE STREAM.

B THIS IS MAINLY FOR DIAGNOSTIC AND MAINTENANCE PURPOSES

C THIS CONTROL CODE IS USED TO IDENTIFY THE SLOT NUMBER, IDENTIFYING WHICH NTE SHOULD SEND ITS CONTROL SLOT NEXT.

D THIS IS SIMILAR TO THE CASE ABOVE, BUT ALLOWS THE NTE TO REMAIN IN A VERY LOW POWER MODE.

E THESE ARE USED TO CHANGE THE NTEs RANGING DATA.

F THESE ARE TO CONTROL THE NORMAL UPSTREAM CELL SENDING

| VPI FIELD (12 BIT FORMAT) | INTERPRETATION |
|---|---|
| 0000 0000 0000 | IDLE CELLS NORMALLY |
| 0000 0000 0001 | ANY NEW NTEs |
| 0000 0000 0010 | USED FOR CONTROL PURPOSES TO ALL NTEs |
| 0000 0001 POTS | POTS CELL |
| 0000 001N NNNN | MAMBA INTERNAL CONTROL TO NTE NNNNN |
| 01BB BBBB BBBB | BROADCAST CELL ON CHANNEL BBBBBBBBBB |
| 1NNN NNxx xxxx | POINT TO POINT CELL TO NTE NNNNN ON VPI xxxxxx |
| OTHERS | RESERVED FOR FUTURE |

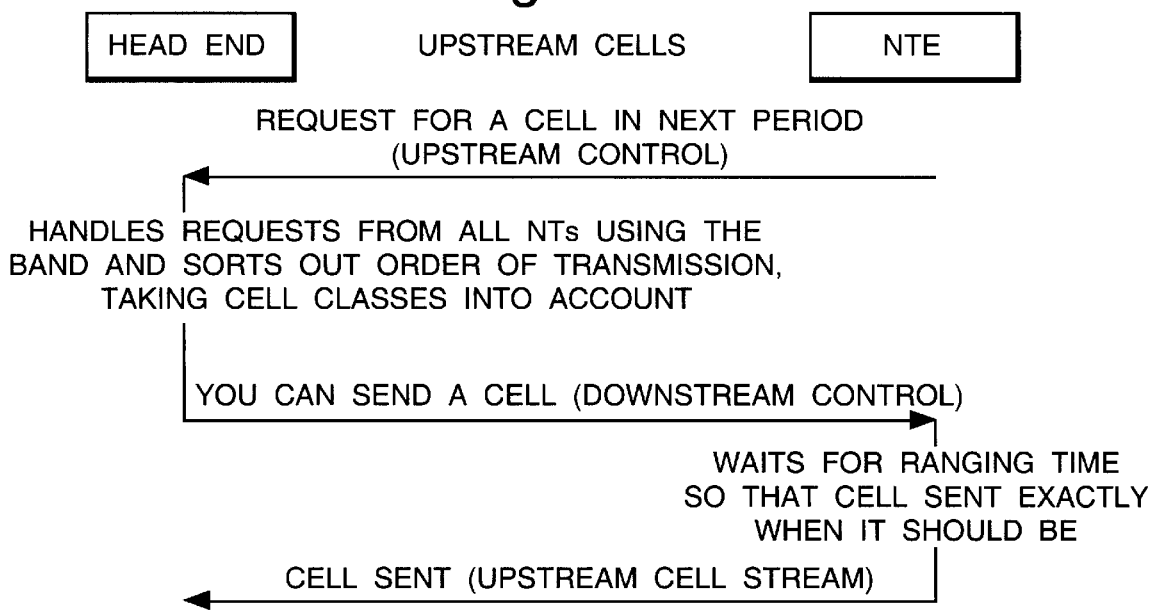
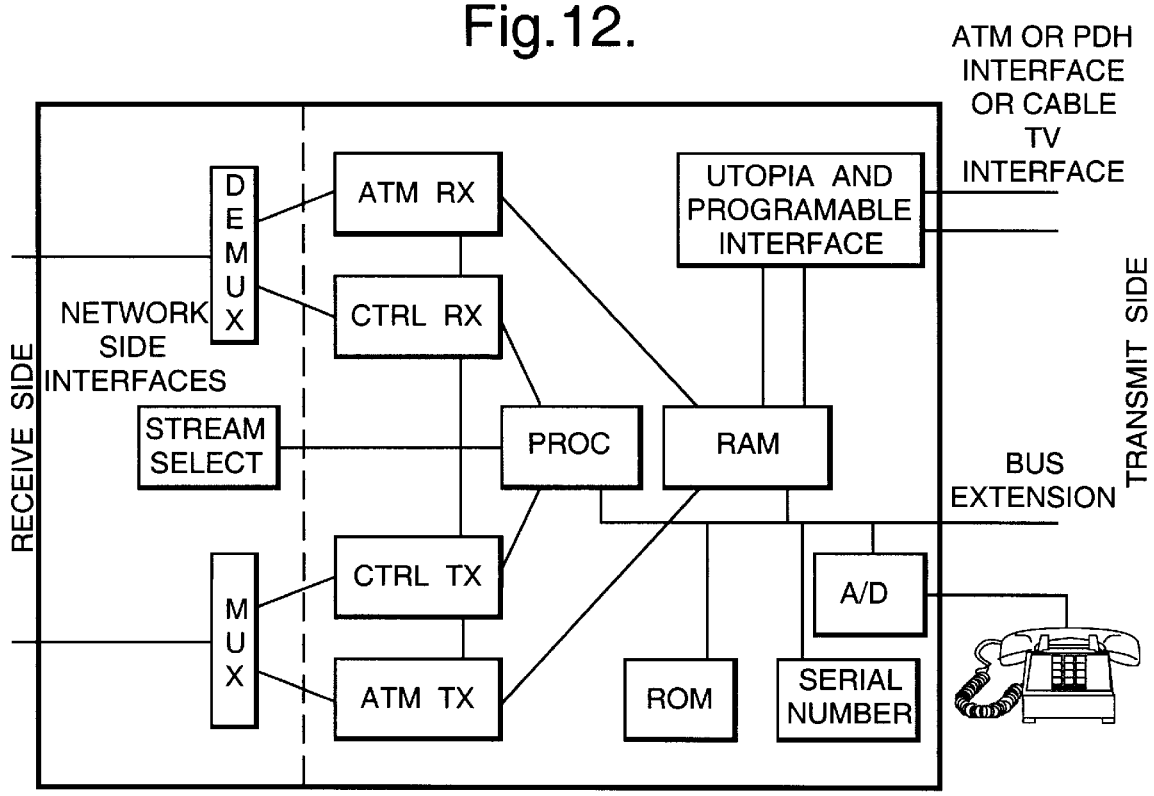

TELECOMMUNICATIONS NETWORK

This application is a continuation in part of Ser. No. 08/498,427 filed Jul. 5, 1995 now abandoned.

BACKGROUND OF THE INVENTION

The present invention refers to co-pending Application Nos. GB9413716.3, and GB9418349.8, both entitled "Telecommunications Network".

The term Network Termination (NT) used in the above referenced Application No. GB9413716.3 has been replaced in the present application by Network Termination Equipment (NTE). It should be realised that the two terms are interchangeable in the context of these applications.

The invention relates to an Asynchronous Transfer Mode (ATM) based Passive Optical Network (PON) system to handle up to 50M of bidirectional traffic for each customer. The PON can scale from a few customers to 4000+ customers using active and/or passive splitting, utilising the best aspects of Time Division Multiplex (TDM) Wave Division Multiplexing (WDM), Time Division Multiplex Access (TDMA) and ATM without their problems.

SUMMARY OF THE INVENTION

According to the present invention there is provided an optical communications network comprising a Head End Unit connected to a plurality of groups of Network Termination Equipments (NTE) and/or Optical Network Units (ONU), wherein downstream communication is by Time Division Multiplex, wherein a group is multiplexed onto a stream and a plurality of streams are combined into a higher speed multiplex and upstream communication is by Time Division Multiplex Access.

Preferably the combining is carried out by the use of Wave Division Multiplexing.

BRIEF DESCRIPTION OF THE DRAWINGS

The present invention will now be described, by way of example, with reference to the accompanying drawings, in which:

FIG. 3 shows a diagrammatic representation of a pair of ATM pipes as used in the present invention;

FIG. 4 shows a diagrammatic representation of the downstream data stream;

FIG. 5 shows a diagrammatic representation of the upstream data stream;

FIG. 6 shows the format of the information in both downstream and upstream cells;

FIG. 7 shows a cell coding system for an upstream control signal;

FIG. 8 shows the coding system for a downstream control signal;

FIG. 9 illustrates the start up sequence for a Network Termination Equipment at power-on;

FIG. 10 illustrates the contents and interpretation of a VPI field on a downstream link;

FIG. 11 illustrates the procedure for handling a request from a Network Termination Equipment to send a cell into the network;

FIG. 12 is a block diagram of a Network Termination Equipment;

DETAILED DESCRIPTION

Comparing the present invention with the invention described in Application No. GB9413716.3 sub-carriers have been replaced by a two tier TDM approach and the start up band has been removed, initial ranging being performed by a carefully controlled error coding.

Figure 1A:
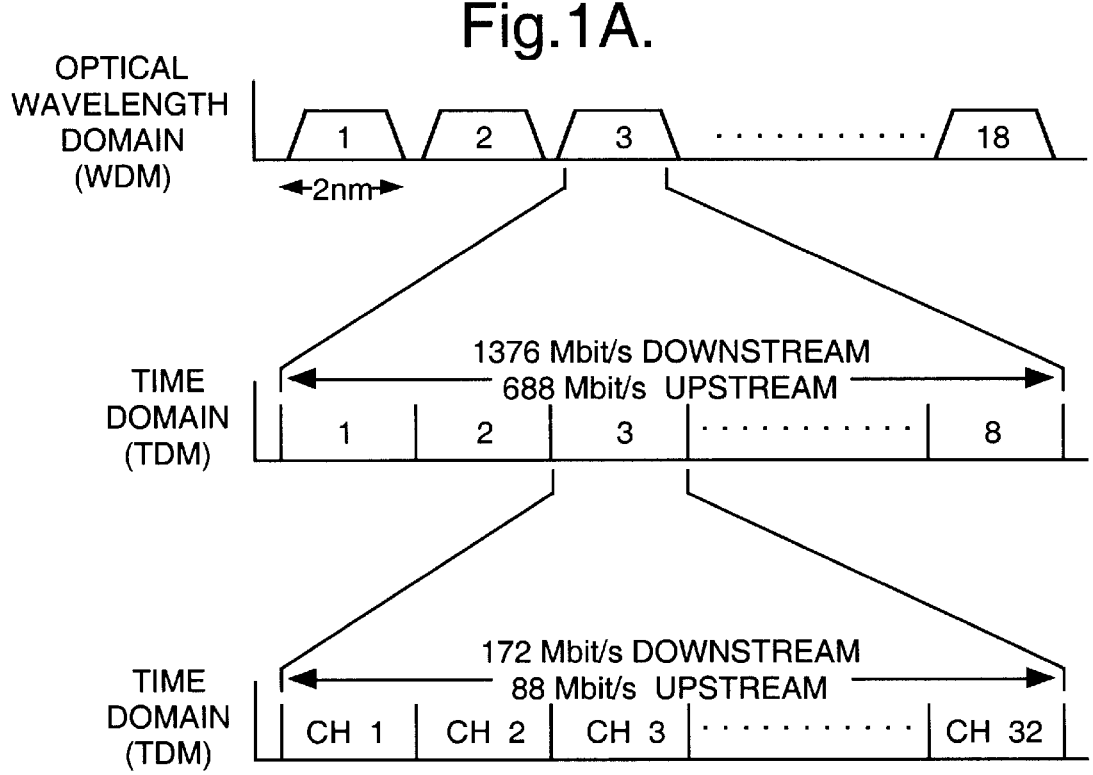
FIG. 1A shows a schematic representation of a multiplex in accordance with the present invention.

32 customers may share a single TDM/TDMA stream, TDM being used downstream and TDMA upstream. In the initial version 8 TDMA streams are combined into a higher speed TDM multiplex. Each high-speed TDM multiplex, serving up to 256 customers is assigned to a specific wavelength channel. The wavelength channels are multiplexed at a higher order optical node into a single fibre using WDM techniques. The overall WDM and TDM multiplex is shown schematically in FIG. 1A. The WDM technology currently available can offer 2 nm spacing economically, if this is confined to the amplification window of an Erbium Doped Fibre Amplifier (EDFA) of 30–35 nm then 12 channels can be assumed with confidence, possibly 16.

$12 \times 256 = 3072$ $16 \times 256 = 4096$

Figure 1B:
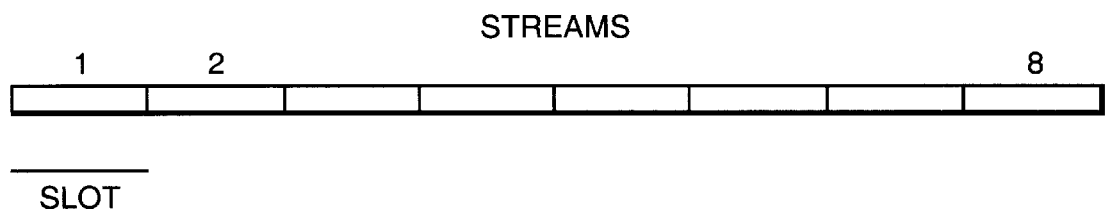
FIG. 1B shows a data stream for use in the present invention.

Thus a single fibre is expected to be able to carry 3072 to 4096 customers. The TDMA system uses 8 interleaved data streams as shown in FIG. 1B. These are word interleaved (32 bits) to align with the word size in the NTE. The benefit of this is to constrain the high speed logic to a small amount, leaving the bulk of the circuitry within the CMOS logic.

Downstream: 32 bits per slot, 256 bits per cycle

Bit period=$(1/1376)\mu s$=0.727 ns, cycle=186 ns

Upstream: 32=10 bits per slot, 336 bits per cycle bit period=$(1/688)\mu s$=1.45 ns, cycle=488 ns In the downstream direction, additional framing is necessary to ensure that the NTEs remain locked on to the right data stream, upstream it is essential to have timing gaps, or guard bands and a start bit for each word, ranging runs permanently using a control slot and the framing in the downstream.

Figure 1C:
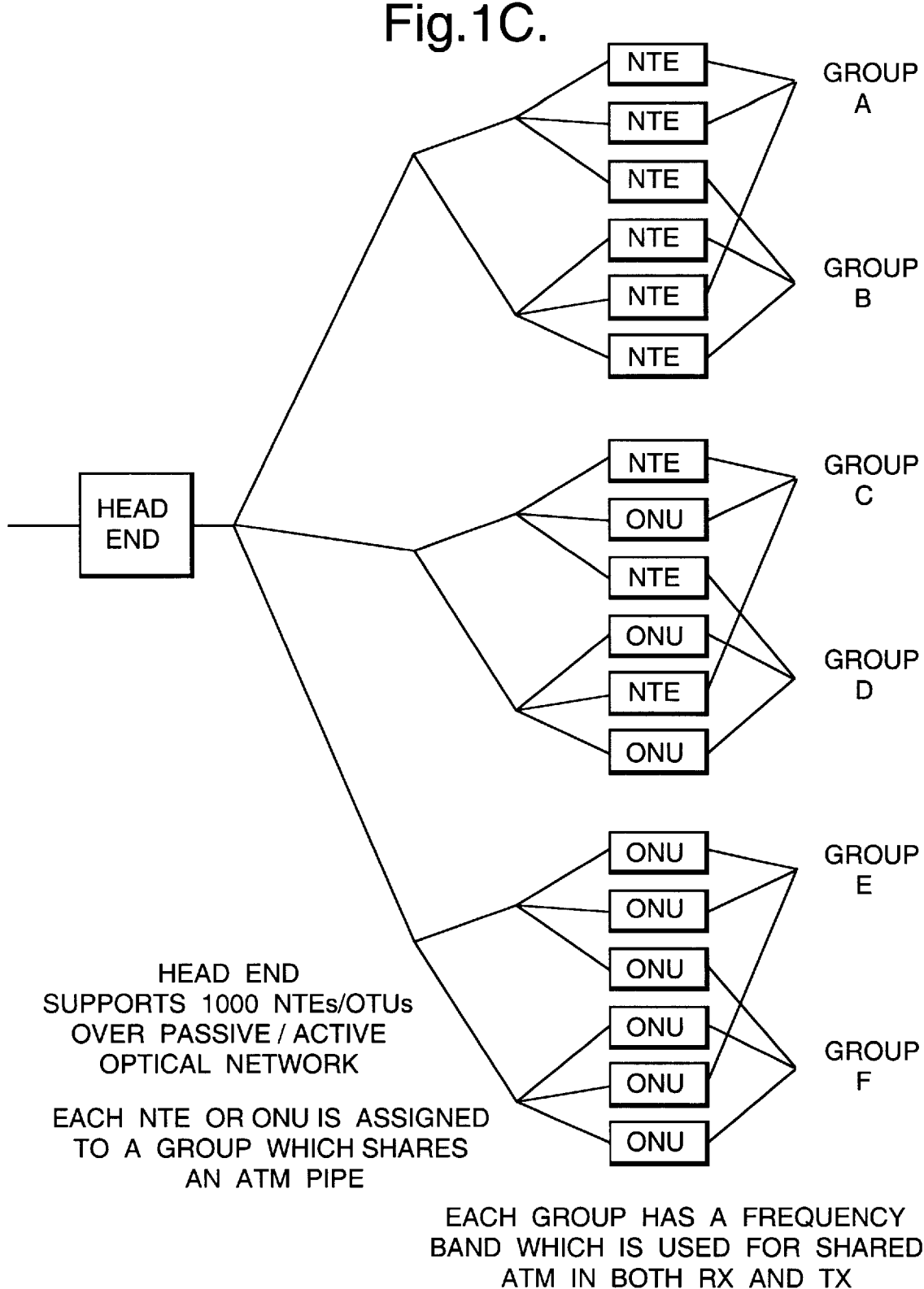
FIG. 1C shows a block diagram of the basic network of the present invention.

The basic network concept is shown in FIG. 1C, a head end supports a lot of Network Termination Equipments (NTEs) across an optic network with passive and optionally active splitters. Typically it will operate at ranges up to 200 km without any performance degradation, though it can operate at longer ranges. In all cases Network Terminal Equipments (NTEs) and Optical Network Units (ONUs) should be considered as interchangeable.

The system operates with two fibres, one for each direction. This is regarded as cheaper at the moment, though in principle this could work with one bidirectional fibre if this was appropriate.

The transmission on the fibres is divided into streams, each stream being used for both ATM and control. The streams are multiplexed in a way that minimises the logic that has to operate at a very fast rate.

The transmission uses a number of wavelengths, each wavelength carrying a number of streams.

Each stream is shared by a group of up to 32 customers, these groups are unrelated to the physical splits in the network.

The description that follows is for a fibre/fibre optical network. The other cases are covered later.

Figure 2:
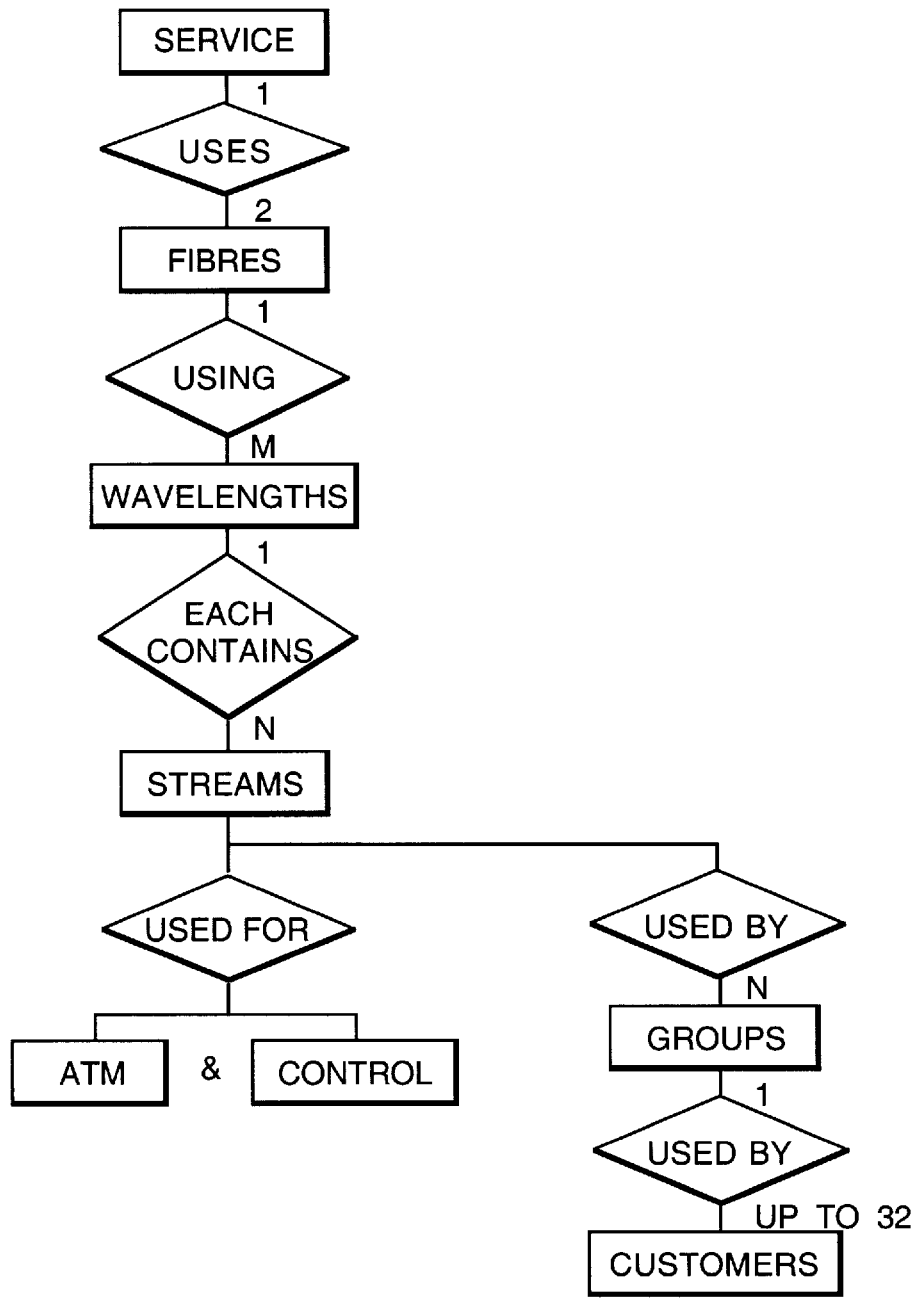
FIG. 2 shows the relationships existing in the network of FIG. 1.

FIG. 2 illustrates the relationship between services, fibres, streams, groups and customers:

Over a fibre that could be split thousands of ways both actively and passively, the PON will provide a number of streams. Each stream will consist of a Time Division Multiplex (TDM) stream, used for both ATM and for control. Each stream can be assigned to groups of up to 32 customers.

The ATM pipe is asymmetrical and will initially provide a capacity of about 150M downstream and about 50M upstream.

Over the fibre there can be many groups. As more customers are added more groups can be added.

The 8 streams are multiplexed together in a simple TDM multiplex, with one 32 bit word from each of the 8 streams sent in turn. The description that follows covers the behaviour of one of these streams.

In the downstream direction a small amount of control and framing is added to the front of a cell. In the upstream direction, there are alternate small and large slots, the large slots carry an ATM cell, the small slots allow each of the NTEs in turn to communicate their control requirements. Upstream each word of each stream has a guard band and a preamble to allow the timing to be determined.

The PON in the downstream direction delivers cells to the NTE which selects those that it needs and processes them. In the upstream direction there is a Time Division Multiplex Access (TDMA) system operated with guard bands. The initial ranging is performed by a slow speed controlled error coding that should not interfere with normal traffic. Once the link is up the head end can notice any drift and send new ranging data as needed.

Customer identification and security is based upon a unique identity in each NTE. This is not customer accessible or interceptable.

Below are the definitions of various terms used herein:

| | |
|---|---|
| GROUP | Up to 32 customers sharing the same ATM pipes and same frequency bands. |
| ATM PIPE | A carrier of ATM eg 155M, 51M. |
| Stream | A stream on the PON, carrying ATM and control. |
| UPSTREAM | Data travelling from the NTE to the Head end. |
| DOWNSTREAM | Data travelling from the Head end and the Network to the NTE and beyond. |

Each group on the PON will operate two separate logical ATM pipes as illustrated in FIG. 3: one from the network to the customers and one from the customers to the network. Each pipe will operate on ATM dividing the capacity between the circuits used by the customers. The capacity of the downstream pipe is larger than that of the upstream pipe.

There will be a number of separate groups with their own ATM pipes in each direction to serve a lot of customers or heavy traffic loads. Each ATM pipe is carried in its own stream.

The number of pipes actually provided on a PON would depend upon the maximum traffic load that the PON had to carry. Equipment can be added at the head end to support more groups, as customers take up service or their bandwidth requirements increase. The number of customers allocated to a group would depend upon the total load that they require. This provides an efficient and flexible approach. An advantage of this approach is that it minimises the initial installation cost and makes the design of the equipment relatively simple because each ATM pipe is working at a relatively low rate within the capabilities of standard Application Specific Integrated Circuits (ASICs).

The allocation of cell slots in both downstream and upstream directions is controlled by the head end. A control protocol is used to allow NTEs to request upstream cell capacity in order to support dynamically varying circuits. The control protocol also supports ranging and the necessary configuration actions on subscribers NTEs and identification numbers.

The whole system operates synchronously within the 8 KHz framing with 32 timeslots over two frames. Each timeslot corresponds with 3 cells down, 1 cell up and requests by one NTE to send cells. By operating this way the operation is deterministic and the framing is relatively simple to handle. This is because there are an integral number of cells in a frame, and as it is a multiple of 16 it eliminates the requirement for complex framing that would be the case if it operated at exactly SDH rates.

There is a separate ATM pipe in each direction of transfer ie upstream and downstream. The downstream pipe is set nominally at about 155 Mbit/s capacity, while the upstream pipe is one third of this at about 51 Mbit/s. The actual ATM data rates are marginally above this to allow an integral number of cells per frame.

The downstream direction is relatively straightforward since only the head end has to transmit cells. In addition to raw cells of 53 byte long there will cell delineation framing, error detection coding and timing information for synchronisation of the NTE's timing at the bit, frame and multiframe level. It is assumed that this stream will operate at 48 cells per 125 microsecond frame in order to make operation simple and also to make it capable of a preallocated locked operation.

The head end determines from the traffic presented to it for each group of NTEs under its control which cell to sent next. It is possible to permanently assign cells slots if required and apply multiple levels of priorities to cells. If cell allocation were done over 5 and $\frac{1}{3}$rd frames (48 rows of Synchronous Digital Hierarchy (SDH) 252 cells) then one cell needs to be allocated per column of SDH tributary being transported. The minimum number would be 3 or 4 cells for 1.5 Mbit/s and 2 Mbit/s respectively giving a worse case packetisation delay of around 225 microseconds (168 $\mu$s for 2 M bit/s).

The Virtual Path Identifier/Virtual Channel Identifier (VPI/VCI) fields can be used in the ATM cell header by the NTEs to determine if the cell is destined for them. It is intended to provide a multicast capability on the PON itself in order to conserve bandwidth. Thus all NTEs that want it will pick up the one copy of a cell when it is transmitted. This will provide considerable savings for popular broadcast video channels. So that NTEs may conserve power if their cell rate is low then the downstream control channels transmits an NTE wake up signal for each cell slot. This wake up signal is essentially the address of the destination NTE (or NTEs in the case of multi-case connections). The framing pattern between cells will be chosen such that it allows clock recovery.

The upstream direction is more difficult than the downstream since there are a number of NTEs, all of which need to transmit cells without colliding with other NTEs. The NTEs will receive timing from the downstream control link and will synchronise themselves to this timing. During the ranging process the loop delay on the link will be measured. The NTEs will operate logically all at the same synchronised time. When transmitting they will put the output link through a delay element which is shortest for long links and highest for short links so that all cells will arrive back at the head end at the same time for a given cell slot window. The delay they use is twice the maximum ranging loop delay minus the measured loop delay.

The cells will need a run pattern for clock recovery and delineation of the cell start. The identity of the transmitting NTE will also be sent in order to check that the correct NTE has responded and a check code to detect errors in transmission. The allocation of which NTE may transmit is governed by the head end.

The downstream control information on the front of cells will broadcast to all NTEs the identity of the NTE which each cell slot upstream has been allocated to. This allocation has to work in advance of the cell slots to allow for the worse case transmission delay. In order to cater for variable rate data the NTEs are able to request slots on the upstream control link. Periodic access is made available on the control channel to each NTE for this purpose. The NTEs provide the quantity and priority of cells slots that they can use in the next batch of upstream cell slots. The head can allocate fixed upstream cell slots for periodic synchronous traffic if necessary to minimise delay for this form of traffic and can thus operate with same delays as outlined above for the transport of SDH tributaries. Note that these delays appear to be considerably better than Telephony Passive Optical Network (TPON) for carrying this form of traffic.

On each wavelength there will be a number of data streams which are word aligned to fit with the memory structure in the NTE and hence make the system relatively cheap.

The downstream data is simply multiplexed in the way shown in FIG. 4.

Each stream has framing information to help the system to identify the streams correctly.

Upstream between each word from each stream there has to be a start bit and a guard band as shown in FIG. 5.

If the upstream total data rate is half that of the downstream data rate a guard band of 9 bits results.

Stream formats are shown in FIG. 6.

The control information downstream for a stream is carried in front of each cell, upstream, separate small slots are used to carry control and POTS. Unlike the ATM the control runs in a synchronous manner with pre-allocated slots to NTEs on the upstream control. Both directions of transfer are linked into the cell slot opportunities on the ATM pipes.

The size of the downstream guard band is to make the data rate easy to handle at 90×2M. In the upstream direction this gives large gaps that allow very loose ranging accuracy. In all cases it is assumed that an 8 bit preamble allows a good definition of the timing.

There is an option to support higher upstream capacity on some groups. These NTEs would have to operate faster and would be different. The head end could be expected to cope with both options. A different (more complex) modulation would be necessary to pass 2 or 3 upstream cell slots and one control slot in the time period and the guard bands are different for these cases.

The upstream control stream, cycles every 250 microseconds. Each of the 32 NTEs has a small control slot on this stream of 64 bits.

To allow for the Controlled Error Coding described in greater detail in the above referenced application filed on the same date as this application and used for initial ranging, it is essential that single bit error correction must be provided on the odd and even bits. This will at a minimum require a 5 bit Hamming number, it is desirable for a better error detection to be available, this will probably use some spare bits. A check code is essential, this must cover the data and the identity of the NTE, the NTEs identity itself need not be transmitted.

The control slot also has 32 bits that are sufficient to carry Integrated Services Digital Network (ISDN) 2B channels with negligible added delay. This is explained in more detail below. For low rate ISDN a D channel can be carried as a cell, there is no point in providing low delay operation for the D channel.

To allow for cell slot requests, 16 bits are sufficient to allow for two classes if necessary and operate without any degradation out to 200 km. The simplest coding is as shown in FIG. 7.

It is important to send framing and notify the NTEs which NTE is to send each upstream cell. This can be achieved by a field on the front of each cell. There are three cells downstream for every one cell upstream. This control field is used in one for framing, in another to notify what NTE to send a cell. This is shown in FIG. 8.

Figures 9, 10:
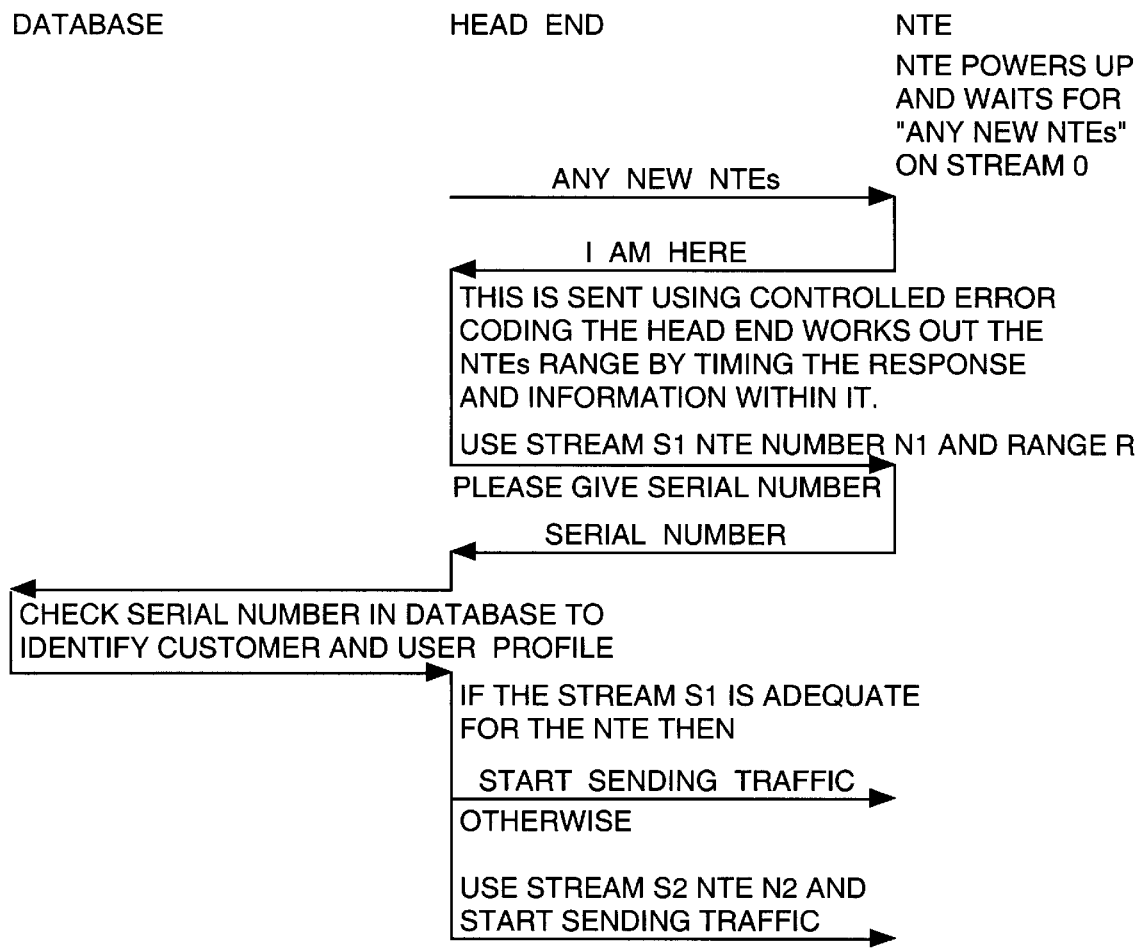
Figure 13:
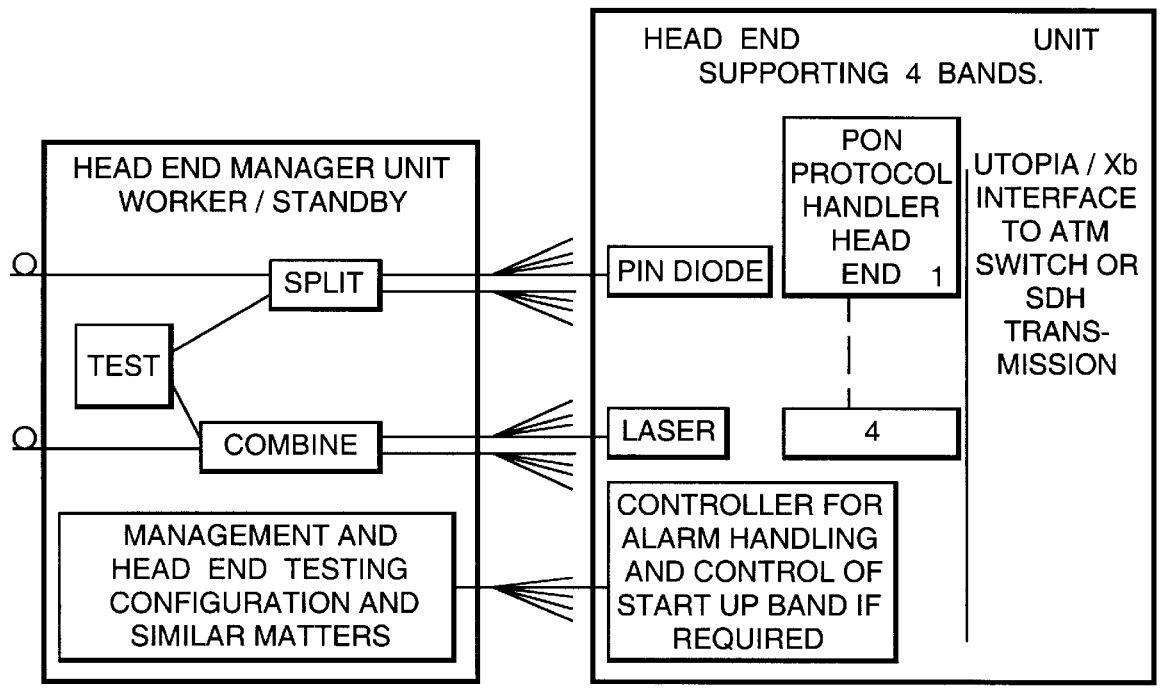
FIG. 13 is a block diagram of a head end unit.

The sequence in FIG. 9 illustrates how an NTE will be started up on power on.

When the NTE wakes up it tunes to stream 0 and waits for the head end to ask if any new NTEs have powered up. When the NTE receives the "Any new NTEs" it will respond with a particular data pattern and some random label. The pattern is used by the head end to check the ranging and to check for a clash. If there is a clash it does nothing. If the NTE does not get a response it backs off for a random period.

When the head end gets the "I am here" message it works out the range of the NTE and responds with the range information, a stream and NTE identity to use on that stream, and asks the NTE for its serial number.

When the NTE provides the serial number (embedded with lots of check information) the head end sends this to an external database. This identifies the customer from the NTEs serial number and also their capabilities and bandwidth. Once the NTE identity has been found, the head end can reassign the NTE to a different stream if necessary (because of high bandwidth use for example), and give it a new NTE id (timeslot).

The head end can also inform the database or management system of the distance to the NTE. The head end may raise reports if it find an NTE at a significantly different distance than would be expected.

The NTE can then operate normally.

The cells are sent on the downstream link. The NTE looks at the VPI in the cell header to decide if it wants the cell. The relationship of VPI to NTE could be fixed as proposed in the table shown in FIG. 10, or could be dynamic if required. If dynamic VPI allocation is required then the 1NNNNNXXXXX VPI space would be assigned VPI at a time. The NTE would need a look up table to determine which VPIs it wants. A small table will be required to identify the broadcast cells it requires.

To send a cell into the network, as shown in FIG. 11, the NTE will wait for its slot on the upstream control and them requests a cell in the next period. The head end orders the requests and notifies the NTE when it can send a cell. It is possible to support multiple classes of traffic, with the NTE requesting a number of slots of each class.

Broadcast channels will be transmitted once on a band, though it may be transmitted on many different bands. The NTE will pick up those channels it wants from that VPI field. The NTE needs to be told to select the given channel and send it to the customer, which may involve a VPI/VCI translation.

When the customer requests connection to a broadcast channel, the customers request will be actioned at the head end, (as well as possibly in call handling to establish the presence of the channel at the head end and for charging/statistics) the head end will then inform the NTE to select the VPI value and pass it on.

There are two classes of cells, those with low delay requirements and the rest. NTEs can ask for cells of each type. The head end can simply keep a First In First Out (FIFO) queue of requests of high priority cells and if there are any high priority cells queued then it will send these requests first. If there are no high priority requests there are a number of strategies for handling low priority cells, it could again have the FIFO and handle each NTE in turn for up to 32 low priority cells or it could handle the NTEs in a round robin taking one from each. The round robin may be fairer and simpler as well.

The NTE could be designed to fit within a standard BT phone socket. The functionality is almost entirely contained within one or two ASICs. The only additional components would be a pin diode and laser to link to the fibres and a minimal power supply to power the ASIC and to provide power and ringing to the telephone, the NTE might require more RAM than can simply be provided on the ASICs, if this is so then additional RAM can be fitted.

FIG. 12 shows a logical block diagram of the NTE (mostly one ASIC). The receive side receives the ATM and the control through a tuner. The control and preamble allows the NTE to control the transmit side and wakes the receive side of the ATM up, this can look at the VPI field and decide it is wants the cell, if not the NTE can go to sleep until the next cell. When there is a cell it wants if DMAs the cell in to the NTE's RAM.

The processor when examining incoming cells does any necessary translation (for broadcast cells) and de-crypts and processes them. This processing can vary according to the type of interface.

For an ATM interface the cells are simply queued.

For a 2 Mbit/s interface the cells have the appropriate ATM Adaption Layer (AAL) processing performed.

The interface may be programmed to behave in a number of different ways to support different configurations, this is covered in more detail in a later section.

The low power Advanced RISC Machine (ARM) processor has a small Read Only Memory (ROM) a Random Access Memory (RAM) for cells and data, and can access the unique serial number when required. The processor bus is taken off chip, to allow additional memory and buffering for users sending lots of bursty data traffic.

In the Transmit direction the outgoing cell sender Direct Memory Access (DMAs) the cells from memory as necessary and transmits the upstream control information that has been set up by the processor. This also has range and power control so that the control and cell information is sent at the right time.

The Processor also acts as a Digital Signal Processor (DSP) for handling the Plain Old Telephone System (POTS) telephone connected directly to the NTE. This is supported through an integral Analogue/Digital (A/D) converter.

The Tuner is controlled by the processor to tune the NTE into a particular band. It will boot up into the lowest start up band, and then when required move up to a higher traffic carrying band when the start up protocol has been negotiated.

Most of this ASIC (the ARM processor, RAM, DMAs and UTOPIA/Programmable Interface) already exists as part of an ASIC which is currently available. (The current ASIC has additional interfaces which would not be required by the NTE). The A/D converter and main receiver/transmitted units also exist as existing ASICs. The only aspects which would need development are the particular details of the control protocol and the program for the processor.

Power—The NTE can be powered locally or via a copper pair. A battery back up is required if it uses local power.

The head end can support a vast number of customers. There are three parts: The Head End Management Units (HEMUs), the Wavelength Distribution Frame (WDF) and a variable number of Optical Line Termination Units (OLTs). The HEMUs control the system and operate as a worker/standby pair. The WDFs can operate as worker/standby or dual worker as appropriate. The OLTs of which there are one per wavelength may be 1 in N spared, the OLT itself may be two cards, either splitting the traffic half and half, or splitting the multiplexed side from the SDH or switch side.

The OLTs provide the operational head end sending the cells to the appropriate streams, controlling the NTEs and operating the flow control necessary to administer the upstream data. These units also convert the POTs traffic embedded within the upstream control slots into 2M bearers which can then be sent to any 64K based exchange or switch if appropriate.

Given that each stream can support up to 32 customers, then a configuration of 2 HEMUs, 2WDFs and 16 two card OLT sets could support 4096 customers.

The OLTs could interface directly to the ATM switch or be connected to SDH interfaces to enable the interface to operate with any appropriate equipment or to be back-hauled to another site. Each stream would correspond to a 155M port on the ATM switch.

When the NTE is turned on, it selects the first stream and waits for an opportunity for a new NTE to respond. When it can, it responds to the head end. Assuming that there is not a clash the head end will respond to the NTE and give the NTE its initial range. Later when the NTE is in normal use the head end tracks where in the guard band the NTE responds. This band has limits and if the NTE repeatably is operating at a limit, the head end can send new ranging instructions to the NTE. As the line can slowly drift, the NTE must be ranged occasionally to catch any drift. This can be performed on top of a checking cell sent periodically to ensure the NTE is working.

The NTEs will have to be built to a limit of range variation, eg 25 km. The larger the value of this range variation the longer it has to delay each instruction from the head end, and hence the more complicated it becomes. To give 25 km of range, the head end would be sending instructions to the NTEs 32 cells in advance of it getting the reply. (25 km=125 $\mu$s=~16 cells, loop=32 cells).

It is possible to operate with a longer range, provided the variation was less than the NTEs have been built to support by adding a fixed offset at the head end. There would be a corresponding increase in delay for such a system.

The System could also operate power control if required.

The downstream direction needs to carry about 150 M of ATM, it is also desirable to operate at simple factor for the 32 NTEs and to give an integral number of cells per frame. This number is 48 cells, which would operate at 163M. The actual data rate has to be slightly higher to allow for control and framing. The formula is:

$$(\text{Cell}_{13}\text{size}+\text{Control}+\text{Check}_{13}\text{Code})*\text{Cells\_per\_frame}*\text{Frames\_per}_{13}\text{ Second}$$

If the guard band is assumed to be 24 bits and the preamble 8 bits, this gives:

$$= (53*8 + 8 + 16)*48*8000$$
$$= 172.032M$$

This is exactly 84×2.048M.

The 8 streams would be word interleaved, 32 bits from each stream for a total of 1376.256M.

The upstream direction is more complicated as it has to handle two slots and the word interleaving has to allow for a guard band and a preamble. To keep operation simple, it is proposed that this operates at exactly half the downstream rate ie 688.128M, with 8 streams each at 86.016M. From this the guard band can be derived:

A control slot and a cell slot have to fit in the time of 3 cells downstream. Three cells downstream have 1344 bits, therefore it has 672 bits to fit the slots in. There are two words in the control slot and 14 in the cell slot, giving 16 in total 672/16=42 bits per word. Of these 32 are data bits, this leaves 10 bits for a preamble and a guard band. This could be used as 1 start bit and 9 guard bits, or with a large preamble such as 6 start bits and 4 guard bits. 4 guard bits at 688.128M is about 6 nanoseconds of guard space.

It is possible to operate a stream at a faster data rate by sending two cells in parallel at once at twice the data rate. The words of the two cells would have to be bit interleaved so that the error properties are compatible with the controlled error coding.

The NTE is simple and does not need any configuration by a maintenance engineer. It does not have to be configured to a particular stream or have anything set up.

The customer is uniquely identified by comparing the serial number of the NTE (complete with a lot of check information) with a database of customers. As a result of this the customer can be configured to a stream that has an appropriate load on it. Should the customer change his load and need to share the stream with less customers, then this is simply performed by instructing the NTE to tune to a new stream and use a new label in a very similar way to the start up sequence.

The NTE has automatic ranging. When it powers on it performs ranging in a way that does not affect normal live traffic. Once the range has been established, the head end monitors the appearance of the NTE and if it drifts towards one end of the guard band it instructs the NTE to change its ranging parameters appropriately.

Once the NTE has been installed, all that is necessary is to set up on the database the record of the serial number and the customer and then no man intervention is needed.

Automatic reconfiguration (ie with no physical intervention) around faulty cards is possible.

Provision must be made for the downloading of programs to configure the NTE. The ROM based code within the NTE would be sufficient to communication with the head end, but would not include any service specific coding of the customers interface.

To make the system more efficient for carrying simple POTS, there are some special features.

In the downstream direction, a cell is used to carry the 47 timeslots of 2M streams, and the NTEs look at these cells and select the octets that are for them, thus there is no added packetisation delay in sending this data to line.

In the upstream direction, there is capacity within the control stream for each NTE to send 2×64K channels embedded in the stream, such that these do not consume any of the 50M bandwidth of the ATM pipe. This reserves the ATM capacity for other services that actually need it. The upstream delay for this is at most 250$\mu$ seconds, again there is no packetisation delay.

A Private Branch Exchange (PBX) that supports many lines could send whole 2M services over AAL1 in ATM cells and need not worry about delay.

Likewise for multiple N×64 k cases it is possible to sub-load the cells where the delay penalty cannot be born. If a cell carries 8 frames worth of 64 k then it can handle 6 timeslots or 384 kbit/s as a single entity. In the return direction the timeslots can be taken off the cells used for carrying POTS and so those have very low delay. The loop delay would thus be about 1 millisecond.

The NTE would have to perform some buffering of traffic, but it does not have much buffering capability if it relies on the relatively small amount of memory within the ASIC. If it is unable to force the terminals to buffer then it will need additional memory.

The PON could also be used to carry SDH Tributaries using the capacity at regular fixed periods over a multi-frame.

The basic system shares 150M downstream and 50M upstream between groups of 32 customers. These streams can be used for other purposes:

150M Down/100M up shared between 32 customers for slightly heavier upstream use.

Expansion into higher data rates is also possible using different coding as and when necessary.

PON networks can be designed to work in shared PON mediums. The fibres can be split either actively or passively to feed 4000+ customers. Each band can support up to 32 customers, and there can be as many bands as the technology in the tuners can handle.

The system would work for a cable TV network as well as for the PON case. The bandwidth available within a band may have to be reduced, but the same principles would work. This is covered in detail in Application No. GB9413716.3 referred to above.

Functions which could be provided directly in the NTE are:

POTS 1.5 or 2Mbit/s Plesiochronous Digital Hierarchy (PDH)

ATM at 51 Mbit/s or 2 M/bits

N×64 Kbit/s/s

Motion Picture Expert Group (MPEG) transport stream

In addition to the POTS interface provided directly by the NTE processor, several customer specific interfaces would be possible on the NTE.

More complex functions would need to be accommodated by extending the "Utopia" functions. The basic interfaces here would be either an ATM interface at eg. 51 Mb/s or 2 Mb/s. Alternatively a standard 1.5 or 2 Mbit/s/s PDH interface could be provided by implementing AAL Type 1 in the programmable interface.

It would also be possible to provide an MPEG transport stream in the Utopia device by providing the necessary AAL functionality.

Further extensions of the Utopia interface capability could provide additional functions by means of small plug in units to a standard extension interface from the Utopia function. These would probably require co-operation with consumer equipment manufactures. The standard extension interface would be an ATM extendible bus.

MPEG TV decoder or IMTV set-top box connector

ISDN primary or basic rate connector

LAN capability

Simple PBX/intelligent telephone functions

For example, an MPEG TV interface could be provided to connect TV services. This would require a small add on box which would provide a SCART or UHF connection to a TV. It is likely that this box would also support satellite connections. The interface out of the Utopia processor to the box would be MPEG2 transported over either an ATM (eg, 51 Mb/s) or PDH (eg 36 Mb/s MPEG) interface. It would be possible to use the latter ATM format interface to feed directly an IMTV set-top box with control and video streams.

ISDN primary or basic rate terminations could also be provided by a small add on box providing the standard interfaces.

It would be possible to provide for Local Area Network (LAN) or Frame Relay terminations, but it is most likely that existing router etc equipment would be used to provide this LAN to ATM function.

The architecture can evolve to take advantage of higher data rates and advances in ASIC technology.

New NTEs/Head Ends can be developed that operate at higher data rates, on higher frequency bands. these can be used alongside and on the same PON as the earlier units operating at lower data rates.

The processor in the NTE gives a capability to provide a range of different interfaces.

If and when tuneable WDM becomes available at an affordable price, this could be incorporated into the NTE and Head end units.

The embedded serial number allows the provision of considerable security and privacy.

Each NTE will have a unique serial number burnt into it as part of the manufacturing process. This will include considerable check bits and redundancy. The customer can be uniquely identified by the access network interrogating a database to identify the customer and their requirements. This can then be used to control the delivery of encryption keys.

The NTE could provide the encryption/decryption as required. For POTS the encryption would be on an individual timeslot. For broadcast channels the encryption would be on a per channel basis, and for point to point traffic it would be across all VPs going to the customer.

What follows is an example of how this can be made very secure, other methods could also be adopted.

The encryption software can be downloaded to the NTE.

Using the serial number (or part of the serial number) as the key the NTE is provided with two main keys. One is used for point to point traffic and the other for broadcast traffic. The point to point key is used with the encryption algorithm to handle all point to point and POTS traffic. The broadcast key is used to provide a secure channel for the provision of individual keys for individual channels. This is separate from the point to point key as it could be subject to more intelligent attach as more of the data is known, thus reducing the potential privacy loss on the point to point channels. Both keys may from time to time be updated.

At system start up the head end passes two encryption codes to the NTE using part of the NTEs serial number as protection for this data. One code is used for all point to point traffic (including POTS) the other for the control of broadcast channels.

For point to point traffic all cells are encoded using the NTEs point to point encryption this is for both the upstream and downstream directions.

Figure 14:
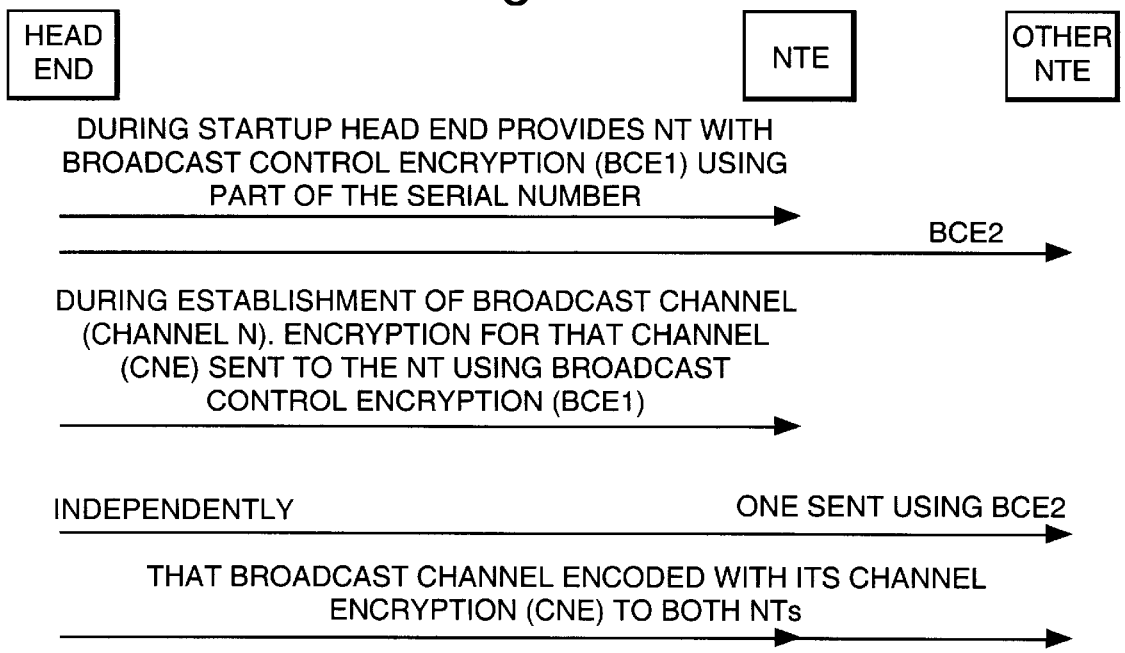
FIG. 14 shows the encryption procedure for broadcast traffic.

Broadcast traffic is the most complex case as each broadcast channel has to have it sown encryption. As the encryption is common across all customers wanting the channel, this protocol is easier to break as some of its contents are known. To prevent this being a week point in the point to point traffic, a different encryption is used as shown in FIG. 14.

POTS traffic is encoded on an Octet by Octet basis using the NTEs point to point encryption. There is a possibility that this may also be encrypted separately.

What is claimed is:

1. An optical communications network, comprising: a head end unit connected to a plurality of groups of network termination equipments (NTE) and/or optical network units (ONU), wherein downstream communication is by time division multiplex, wherein one of said groups is multiplexed onto a data stream, wherein a plurality of said data streams are combined into a higher speed multiplex, wherein upstream communication is by time division multiplex access, and wherein ranging of one of said NTE and said ONU by the head end unit is carried out using controlled error encoding.

2. A communications network as claimed in claim 1, wherein additional combining is carried out by the use of Wave Division Multiplexing.

3. A communications network as claimed in claim 1, wherein transmission over the network is by the use of a plurality of optical wavelengths, each wavelength carrying a number of said streams.

4. A network as claimed in claim 1, wherein each NTE has a unique identity provided during manufacture.

5. A network as claimed in claim 1, wherein each group has two separate logical ATM asynchronous transfer mode pipes, the capacity of the downstream pipe from the head end unit to the NTE being greater than that of the upstream pipe from the NTE to the head end unit.

6. A network as claimed in claim 5, wherein the nominal downstream capacity is 155 Mbit/s and the nominal upstream capacity is 51 Mbit/s.

7. A network as claimed in claim 1, wherein a broadcast channel is transmitted once on a band, a NTE being given the channel identity of a channel which it is to receive and selecting that channel.

8. A network as claimed in claim 1, wherein the head end unit comprises a master unit and a plurality of band units.

9. A network as claimed in claim 1, including provision for carrying plain old telephone system (POTS) communications, wherein a cell within the downstream communication carries the 47 timeslots of a 2 Mbit/s data stream and an NTE selects the appropriate octets from the cell and in the upstream direction a control stream has capacity for each NTE to send 2×64 k channels embedded in the stream.

* * * * *